(12) United States Patent
Gamroth et al.

(10) Patent No.: US 10,928,089 B2
(45) Date of Patent: Feb. 23, 2021

(54) BUILDING TEMPERATURE CONTROL SYSTEM WITH FEEDBACK AND FEEDFORWARD TOTAL ENERGY FLOW COMPENSATION

(71) Applicant: Johnson Controls Technology Company, Auburn Hills, MI (US)

(72) Inventors: Timothy C. Gamroth, Dousman, WI (US); Craig E. Trivelpiece, Mission Viejo, CA (US); Joseph Piccolo, III, Fitzwilliam, NH (US); Kirk H. Drees, Cedarburg, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/262,263

(22) Filed: Jan. 30, 2019

(65) Prior Publication Data
US 2020/0240666 A1 Jul. 30, 2020

(51) Int. Cl.
| | | |
|---|---|---|
| F24F 11/63 | (2018.01) | |
| G05B 19/042 | (2006.01) | |
| F24F 110/10 | (2018.01) | |
| F24F 110/70 | (2018.01) | |
| F24F 130/20 | (2018.01) | |
| F24F 130/10 | (2018.01) | |
| F24F 120/10 | (2018.01) | |

(52) U.S. Cl.
CPC ............ *F24F 11/63* (2018.01); *G05B 19/042* (2013.01); *F24F 2110/10* (2018.01); *F24F 2110/70* (2018.01); *F24F 2120/10* (2018.01); *F24F 2130/10* (2018.01); *F24F 2130/20* (2018.01); *G05B 2219/2614* (2013.01)

(58) Field of Classification Search
CPC .. F24F 11/56; F24F 11/62; F24F 11/63; F24F 2110/10; F24F 2110/70; F24F 2120/10; F24F 2130/10; F24F 2130/20; G05B 15/02; G05B 19/042; G05B 2219/2614
See application file for complete search history.

(56) References Cited

U.S. PATENT DOCUMENTS

| | | | |
|---|---|---|---|
| 5,209,398 A | 5/1993 | Drees | |
| 9,832,034 B2* | 11/2017 | Shetty | ................. H04L 12/2818 |
| 2007/0131782 A1* | 6/2007 | Ziehr | ................. B60H 1/00771 |
| | | | 236/1 B |

(Continued)

*Primary Examiner* — Abdelmoniem I Elamin
(74) *Attorney, Agent, or Firm* — Foley & Lardner LLP

(57) ABSTRACT

A system for controlling temperature of a building space includes HVAC equipment configured to serve the building space, a plurality of sensors configured to measure a plurality of parameters relating to the building space, and a control system. The control system is configured to receive data from the plurality of sensors, generate a plurality of disturbance heat flow estimates for the building space based on the data from the plurality of sensors, determine a feedforward heat flow contribution based on the disturbance heat flow estimates, determine a feedback heat flow contribution based on a measured temperature of the building space and a temperature setpoint for the building space, combine the feedforward heat flow contribution and the feedback heat flow contribution to determine a rate of heat flow to be provided to the building space by the HVAC equipment, and control the HVAC equipment to provide the rate of heat flow.

22 Claims, 9 Drawing Sheets

(56) References Cited

U.S. PATENT DOCUMENTS

| | | | |
|---|---|---|---|
| 2008/0277486 A1* | 11/2008 | Seem | H04L 67/125 |
| | | | 236/49.3 |
| 2010/0019050 A1* | 1/2010 | Han | B60H 1/00642 |
| | | | 236/44 C |
| 2017/0292729 A1* | 10/2017 | Schuler | G05D 23/1919 |
| 2019/0141526 A1* | 5/2019 | Bahrami | H04W 12/06 |

* cited by examiner

BUILDING TEMPERATURE CONTROL SYSTEM WITH FEEDBACK AND FEEDFORWARD TOTAL ENERGY FLOW COMPENSATION

BACKGROUND

HVAC systems are typically controlled to attempt to maintain a desired temperature in a space. For example, a temperature setpoint may be selected for a space. A temperature sensor located in the space measures the indoor air temperature in the space (i.e., at the location of the temperature sensor) and provides the temperature measurement to a controller for the HVAC system. If the measured temperature deviates from the temperature setpoint by more than a threshold amount, the controller alters the operation of the HVAC equipment to attempt to drive the measured temperature towards the temperature setpoint.

In such a case, the HVAC system only reacts after the temperature has already deviated from setpoint. Additionally, because the temperature sensor used for feedback control is located at one position in the space, a lag time may exist between a heat flow at a different area of the space and a temperature change at the temperature sensor. Accordingly, in a scenario where the temperature setpoint is set by an occupant based on the occupant's comfort preferences, the HVAC system may only react after the temperature becomes uncomfortable for the occupant. Systems and methods for a proactive approach to HVAC control may therefore be desirable to provide a more consistent adherence of actual temperature in the space to the setpoint temperature for the space.

SUMMARY

One implementation of the present disclosure is a system for controlling temperature of a building space. The system includes HVAC equipment configured to serve the building space, a plurality of sensors configured to measure a plurality of parameters relating to the building space, and a control system. The control system is configured to receive data from the plurality of sensors, generate a plurality of disturbance heat flow estimates for the building space based on the data from the plurality of sensors, determine a feedforward heat flow contribution based on the disturbance heat flow estimates, determine a feedback heat flow contribution based on a measured temperature of the building space and a temperature setpoint for the building space, combine the feedforward heat flow contribution and the feedback heat flow contribution to determine a rate of heat flow to be provided to the building space by the HVAC equipment, and control the HVAC equipment to provide the rate of heat flow.

In some embodiments, the feedforward heat flow contribution is calculated as approximately an opposite of a total disturbance heat flow estimate. The total disturbance heat flow estimate is defined as a sum of the plurality of disturbance heat flow estimates.

In some embodiments, the plurality of disturbance heat flow estimates includes a people heat flow estimate that quantifies a rate of heat transfer from one or more people in the building space to indoor air of the building space. In some embodiments, the plurality of sensors includes an occupancy sensor configured to obtain a measurement of a number of people located in the building space. The control system is configured to generate the people heat flow estimate based on the measurement from the occupancy sensor and a predetermined per-person heat flow.

In some embodiments, the plurality of sensors includes an occupancy sensor configured to obtain a measurement of a number of people located in the building space and a carbon dioxide sensor configured to obtain a measurement of a carbon dioxide concentration in the building space. The control system is configured to generate the people heat flow estimate based on the measurement of the number of people located in the building space and the measurement of the carbon dioxide concentration in the building space.

In some embodiments, the plurality of disturbance heat flow estimates includes a computer heat flow estimation that quantifies a rate of heat transfer from one or more computers in the building space to indoor air of the building space. In some embodiments, the plurality of sensors include a network router configured to provide a wireless network for the building space and obtain data indicating a number of computers connected to the wireless network for the building space. The control system is configured to generate the computer heat flow estimation based on the number of computers connected to the wireless network for the building space.

In some embodiments, the plurality of disturbance heat flow estimates includes a solar radiation heat flow estimation that quantifies a rate of heat transfer to the building space caused by solar radiation. The control system is configured to generate the solar radiation heat flow estimation based on at least one of brightness measurements from an exterior light sensor of the plurality of sensors, position information for an automated window shade, or weather data. In some embodiments, the plurality of disturbance heat flow estimates includes at least one of a lighting heat flow estimate, a projector heat flow estimate, an electrical load heat flow estimate, or a telephone heat flow estimate.

Another implementation of the present disclosure is a method for controlling temperature of a building space. The method includes obtaining measurements of various parameters relating to the building space, generating a plurality of disturbance heat flow estimates for the building space based on the measurements, determining a feedforward heat flow contribution based on the plurality of disturbance heat flow estimates, determining a feedback heat flow contribution based on a measured indoor air temperature of the building space and a temperature setpoint for the building space, combining the feedforward heat flow contribution and the feedback heat flow contribution to determine a rate of heat flow to be provided to the building space by HVAC equipment, and controlling the HVAC equipment to provide the rate of heat flow to the building space.

In some embodiments, determining a feedforward heat flow contribution based on the plurality of disturbance heat flow estimates includes calculating a total disturbance heat flow estimate as a sum of the plurality of disturbance heat flow estimates and defining the feedforward heat flow contribution as approximately an opposite of the total disturbance heat flow estimate.

In some embodiments, generating a plurality of disturbance heat flow estimates for the building space based on the measurements includes generating a people heat flow estimate that quantifies a rate of heat transfer from one or more people in the building space to indoor air of the building space. In some embodiments, obtaining measurements of various parameters relating to the building space includes measuring, by an occupancy sensor, a number of people located in the building space. Generating the people heat flow estimate includes calculating the people heat flow estimate based on the number of people located in the building space and a predetermined per-person heat flow.

In some embodiments, obtaining measurements of various parameters relating to the building space includes measuring, by an occupancy sensor, a number of people located in the building space and measuring, by a carbon dioxide sensor, a carbon dioxide concentration in the building space. Generating the people heat flow estimate includes calculating the people heat flow estimate based on the number of people located in the building space and the carbon dioxide concentration in the building space.

In some embodiments, generating the plurality of disturbance heat flow estimates for the building space based on the measurements includes generating a computer heat flow estimation that quantifies a rate of heat transfer from one or more computers in the building space to indoor air of the building space. In some embodiments, obtaining measurements of various parameters relating to the building space comprises obtaining an indication of a number of computers that are connected to a network for the building space. Generating the computer heat flow estimation includes calculating the computer heat flow estimation based on the indication of the number of computers that are connected to the network for the building space.

In some embodiments, obtaining measurements of various parameters relating to the building space includes at least one of obtaining brightness measurements from an exterior light sensor, obtaining position information for a window shade at the building space, or obtaining weather data from a weather service. Generating the plurality of disturbance heat flow estimates for the building space includes generating a solar radiation heat flow estimation that quantifies a rate of heat transfer to the building space caused by solar radiation based on at least one of the brightness measurements, the position information for the window shade, or the weather data.

In some embodiments, generating the plurality of disturbance heat flow estimates for the building space comprises generating at least one of a lighting heat flow estimate, a projector heat flow estimate, an electrical load heat flow estimate, or a telephone heat flow estimate.

Another implementation of the present disclosure includes one or more non-transitory computer-readable media containing program instructions that, when executed by one or more processors, cause the one or more processors to perform operations. The operations include obtaining measurements of various parameters relating to a building space, generating a plurality of disturbance heat flow estimates for the building space based on the measurements, and determining a feedforward heat flow contribution based on the plurality of disturbance heat flow estimates. The feedforward heat flow contribution specifies a rate of heat flow to be provided to the building space by HVAC equipment. The rate of heat flow is approximately equal to an opposite of a sum of the plurality of disturbance heat flow estimates. The operations also include controlling the HVAC equipment to provide the rate of heat flow to the building space.

In some embodiments, controlling the HVAC equipment to provide the rate of heat flow to the building space causes an indoor air temperature of the building space to be maintained at an approximately constant value.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building HVAC Systems and Building Management Systems

Figure 1:
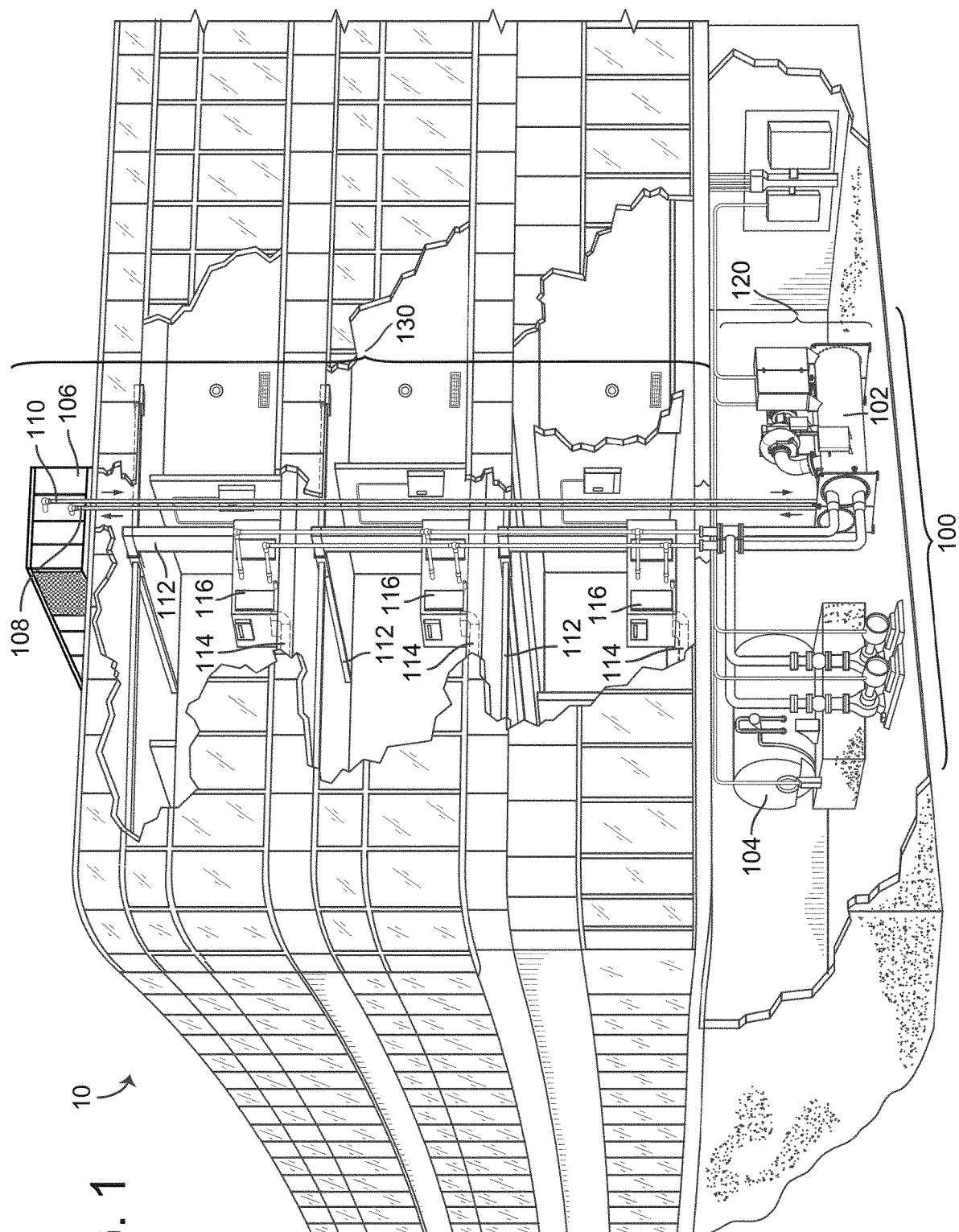
FIG. 1 is a drawing of a building equipped with a HVAC system, according to an exemplary embodiment.
Figure 2:
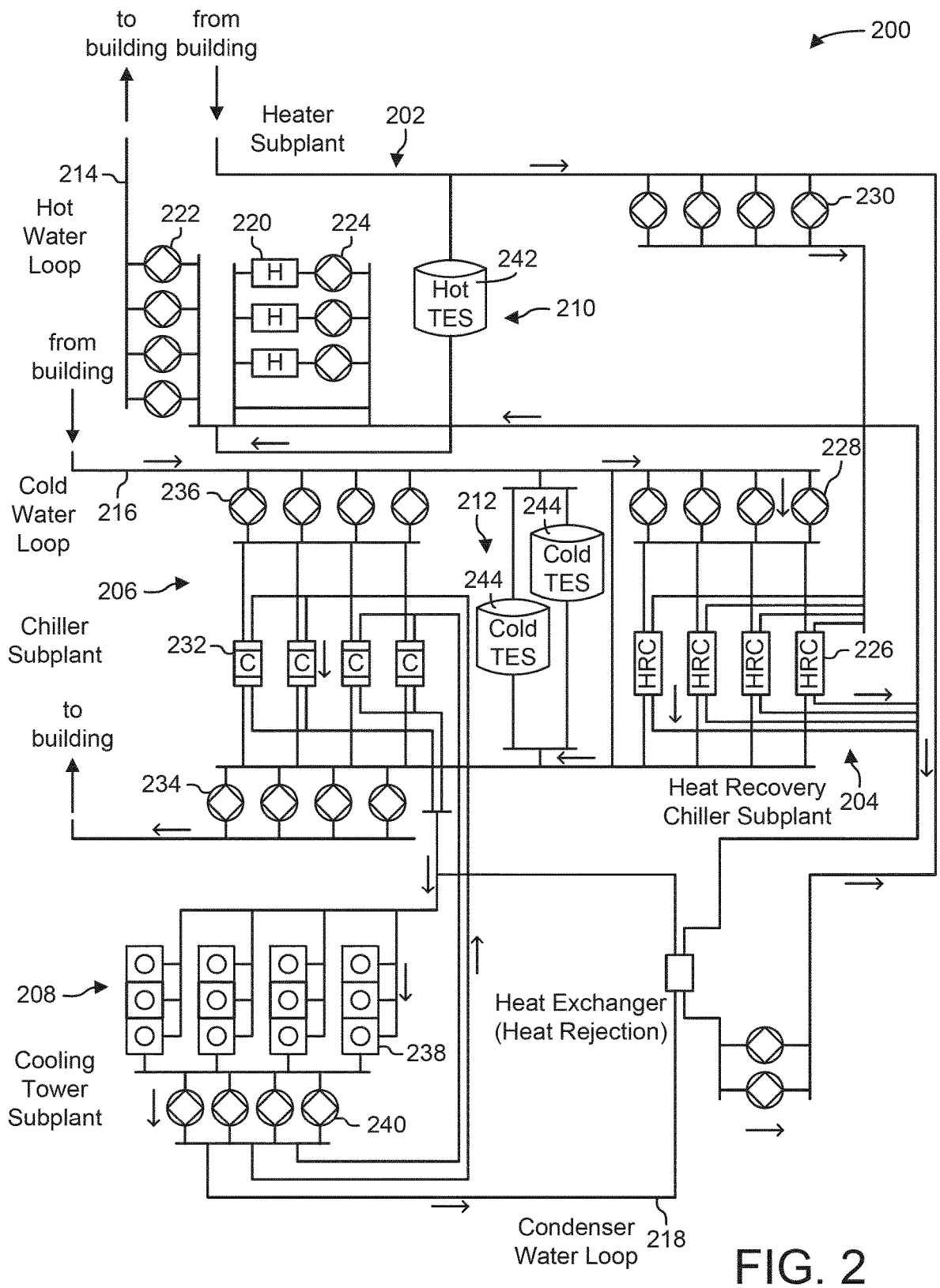
FIG. 2 is a block diagram of a waterside system which can be used to serve the building of FIG. 1, according to an exemplary embodiment.
Figure 3:
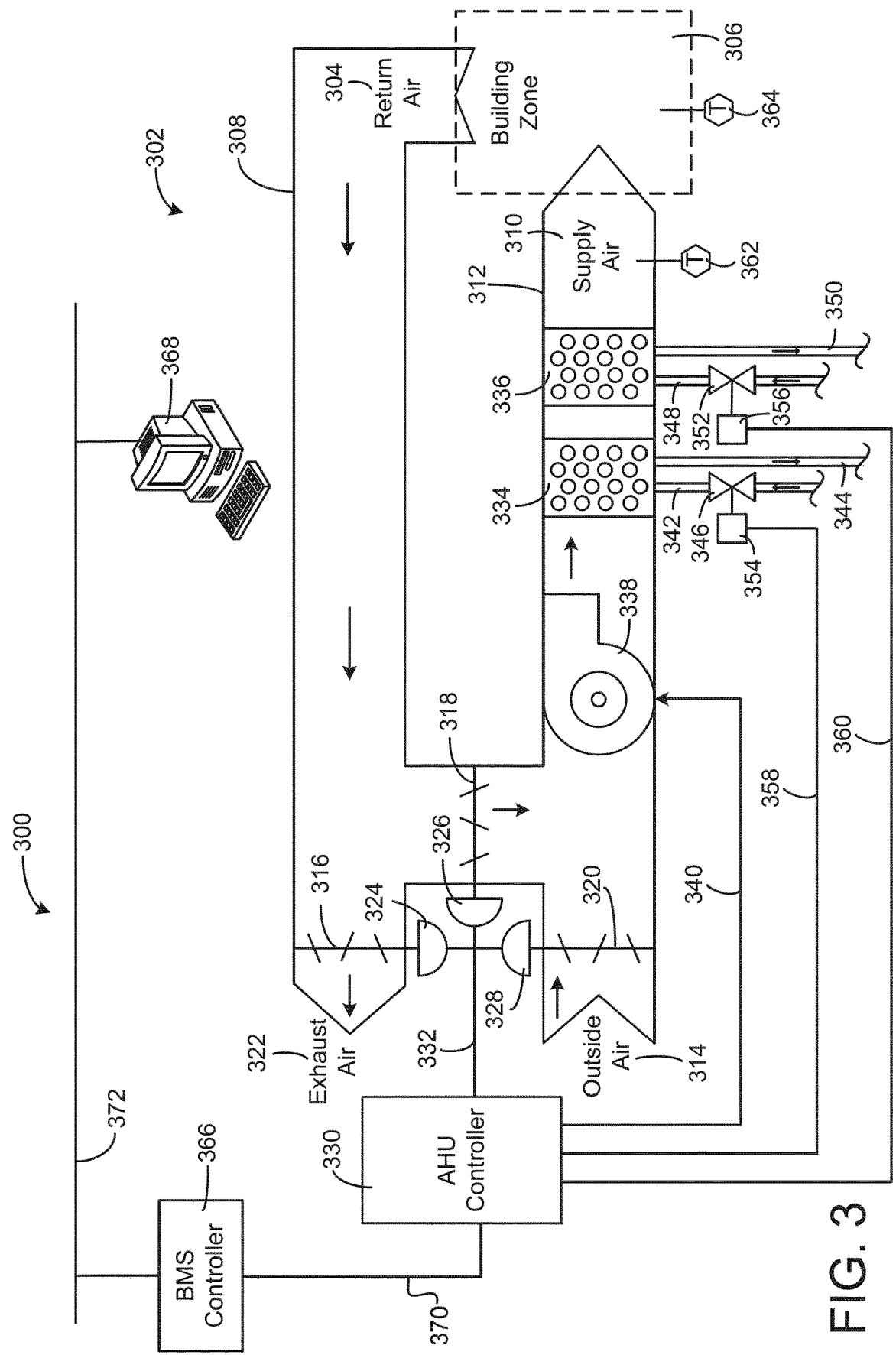
FIG. 3 is a block diagram of an airside system which can be used to serve the building of FIG. 1, according to an exemplary embodiment.
Figure 4:
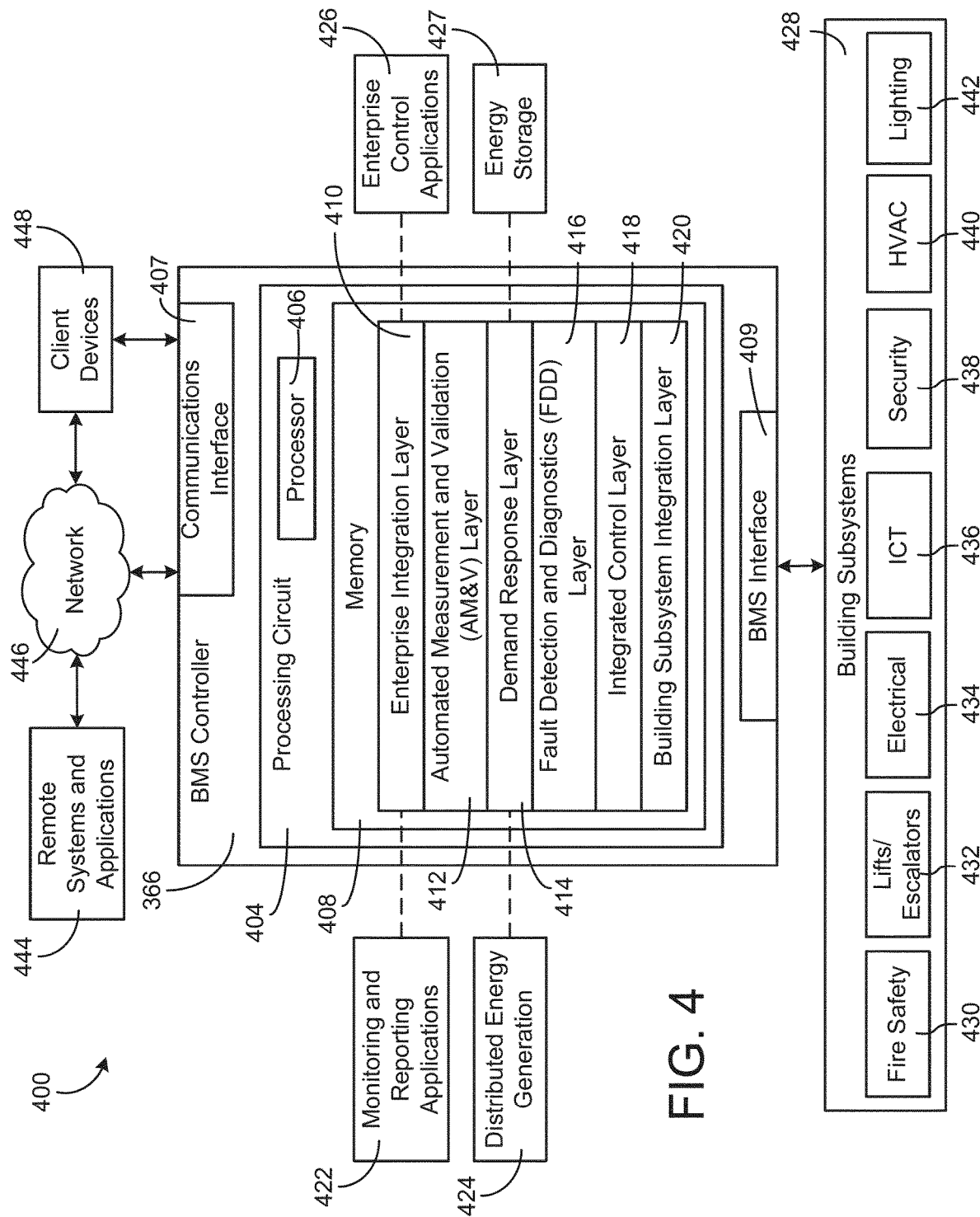
FIG. 4 is a block diagram of a building management system (BMS) which can be used to monitor and control the building of FIG. 1, according to an exemplary embodiment.
Figure 5:
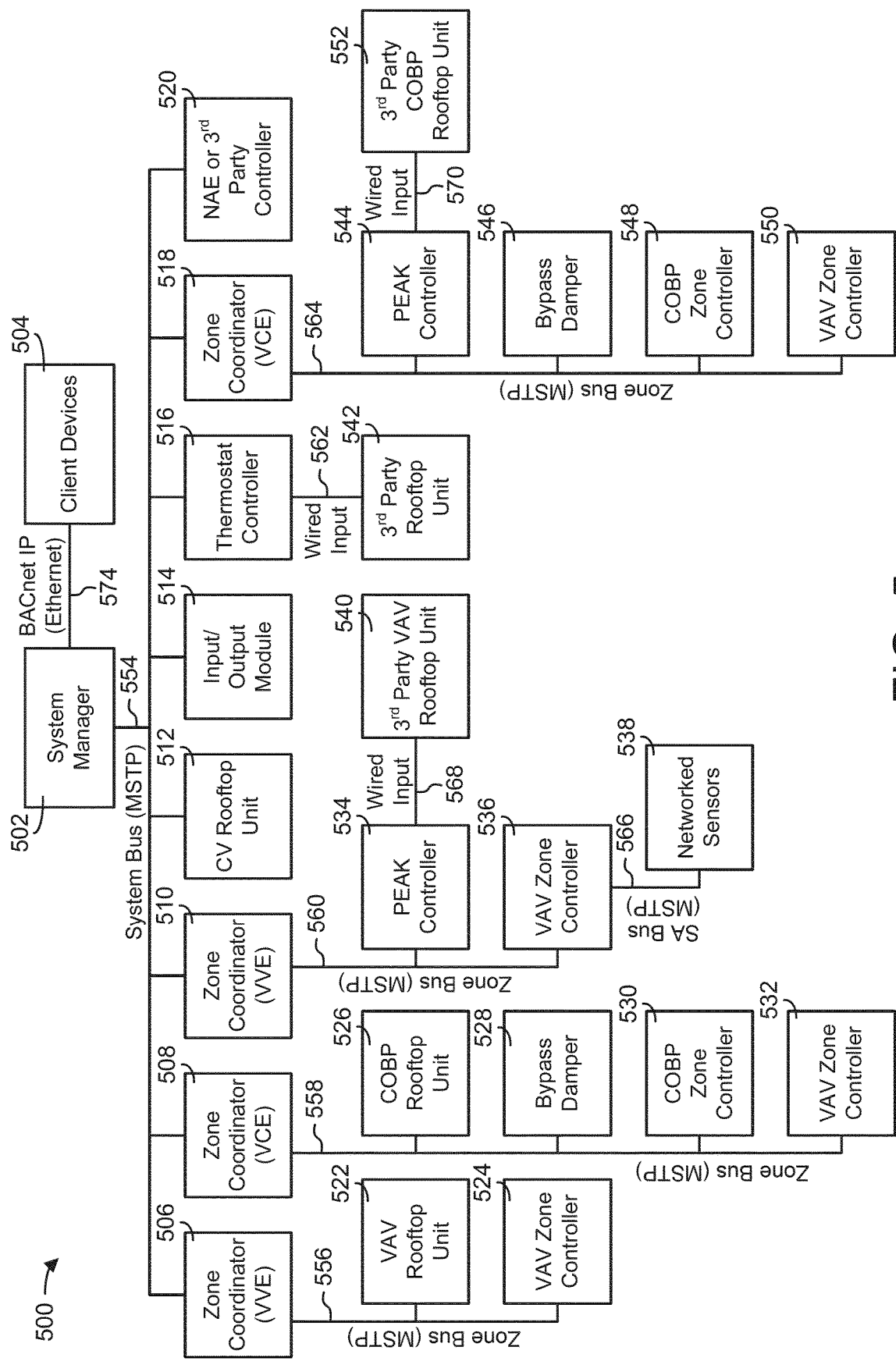
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130.

Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310

(e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Systems and Methods for HVAC Control Using Total Energy Flow

Figure 6:
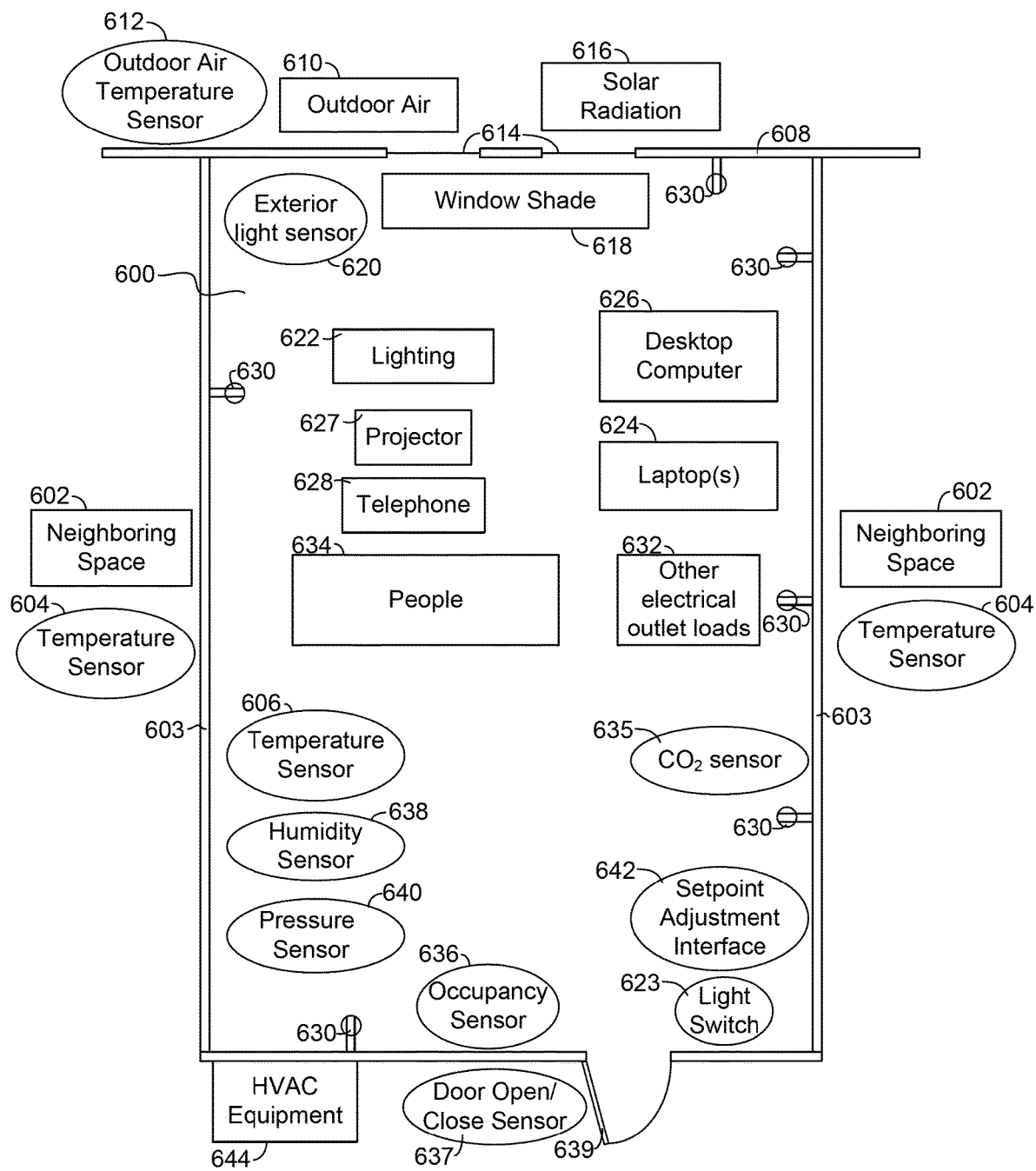
FIG. 6 is a block diagram of a space affected by a variety of heat flows and served by HVAC equipment and a variety of sensors, according to an exemplary embodiment.

Referring now to FIG. 6, a diagram of a space 600 is shown, according to an exemplary embodiment. FIG. 6 illustrates various sources of heat flow into an example space 600 as well as various sensors configured to measure various physical parameters relating to the space 600. FIG. 6 is included for the sake of illustrating various heat flows and sensor measurements, and should not be considered limiting. As used herein, "heat flow" may refer to a positive or negative value of energy transfer, for example such that a heat flow into the space 600 may have either a heating effect or a cooling effect on the space 600 depending on the sign of the value of the heat flow.

As shown in FIG. 6, the space 600 is located in a building that includes neighboring spaces 602 on either side of the space 600 separated by interior walls 603. Heat may flow into the space 600 from the neighboring spaces 602 via the interior walls 603. The heat flow from the neighboring spaces 602 is a function of the relative temperatures of the neighboring spaces 602 and the space 600 and the thermal conductivity/insulation of the interior walls 603. Temperature sensors 604 are located in the neighboring spaces 602 and measure the temperature of the neighboring spaces 602. The temperature of the space 600 can be measured by a temperature sensor 606 located in the space 600. As described in detail below, measurements from the temperature sensors 604, 606 and information about the interior walls 603 can be used to estimate an amount of heat flow through the walls 603 at a given point in time.

An exterior wall 608 on a third side of the space 600 separates the space 600 from outdoor air 610 (i.e., from an external environment subject to weather, climate, etc.). Heat may flow into the space 600 from the outdoor air 610 through the exterior wall 604. The heat flow from the outdoor air 610 to the space 600 is a function of the relative temperatures of the outdoor air 610 and the space 600 and the thermal conductivity/insulation of the exterior wall 608. An outdoor air temperature sensor 612 is configured to measure the temperature of the outdoor air 610. As described in detail below, measurements from the temperature sensors 606, 612 and information about the exterior wall 604 can be used to estimate an amount of heat flow through the exterior wall 604 at a given point in time. In some embodiments, a wind speed sensor or humidity sensor is also included to measure physical parameters of the outdoor air that may affect the rate of heat flow through the exterior wall 608.

As shown in FIG. 6, the exterior wall 604 includes windows 614. Solar radiation 616 (i.e., light from the sun) can shine through the windows 614 and add energy to the space 600 (i.e., provide heat flow to the space 600). A window shade 618 can be included to selectively cover and uncover the windows 614. In some embodiments, the window shade 618 is configured to provide data relating to the position of the window shade 618 (e.g., open, closed, partially open). In some embodiments, the window shade 618 is controllable to automatically change position to manage the heat flow due to solar radiation 616. An exterior light sensor 620 is included in the space 600 and is positioned to measure an amount of light entering the space 600 via the windows 614. Measurements from the exterior light sensor 620 and/or data from the window shade 618 can be used to estimate the heat flow into the space due to solar radiation 616.

Also as shown in FIG. 6, lighting 622 is positioned in the space 600. Lighting 622 light fixtures and light sources (incandescent bulbs, florescent tubes, LEDs, etc.) configured to illuminate the space 600. The lighting 622 generates heat when operating to illuminate the space 600. In some embodiments, the amount of heat generated by the lighting 622 may be predetermined or otherwise known (e.g., by bench testing before installation of the lighting 622). The amount of heat generated by the lighting 622 may vary based on which of various portions of the lighting 622 are turned on at a given time and/or based on a brightness level of the lighting 622 (e.g., when the lighting 622 is dimmable). The lighting 622 may be configured to provide data to a control system relating to the on/off level of the lighting 622, the brightness of the lighting 622, etc. In the embodiment shown, the lighting 622 can be controlled by a light switch 623 and/or the control system 802 shown in FIG. 8 and described in detail below. In some embodiments, the lighting 622 can be controlled to manage the heat generated by the lighting 622, e.g., as part of a control scheme for managing the temperature in the space 600.

FIG. 6 also shows one or more laptop computers 624 and a desktop computer 626 located in the space 600. Operation of the laptop computer(s) 624 and the desktop computer 626 generates heat due to the electrical resistance within electronic circuits of the computers 624, 626. The amount of heat flow provided to the room by the computers 624, 626 may vary as a function of the number of active computers 624, 626, a processing power and CPU utilization of each computer 624, 626, and other factors. In some embodiments, the computers 624, 626 provide utilization data to the control system 802 (described below) that can be used to estimate an amount of heat generated by the computers 624, 626. In some embodiments, a network hub (e.g., a WiFi router) is included for the space 600 and is configured to provide information relating to the number of computers 624, 626 connected to a network (e.g., a WiFi network) at the space 600. Although shown as desktop computers 626 and laptop computers 624, it should be understood that other computing devices such as smartphones, tablets, gaming consoles, etc. may also be used in the space 600 and generate heat in the space 600.

FIG. 6 also shows a variety of other electronic devices, for example a projector 627 and a telephone 628. The projector 627 may include a bulb that generates light used to project an image or video on a screen in the space 600. The bulb of the projector 627 generates heat when the projector 627 is controlled to provide the image or video (i.e., when the projector 627 is "on"). In some embodiments, the rate of heat generation is a known value when the projector 627 is on (e.g., determined by bench testing, listed in a specification sheet for the projector 627). The telephone 628 may be a speaker phone or other landline phone located in the space 600. Due to electrical resistance in electronic circuits of the telephone 628, the telephone 628 may generate a first level of heat while a phone call is in progress using the telephone 628 and a second, lower level of heat while telephone 628 is idle. The amount of heat generated by the telephone 628 may be predetermined (e.g., determined by bench testing).

The telephone 628 may provide data relating to its utilization to the control system 802 shown in FIG. 8 and described below.

The space 600 is also shown to include multiple electrical outlets 630. The electrical outlets 630 are configured to provide electricity to a variety of electrical devices, appliances, etc. that can be connected to the outlets 630, shown in FIG. 6 as other electrical outlet loads 632. The other electrical outlet loads 632 may result in heat flow to the space 600 due to various operations of various devices corresponding to the other electrical outlet loads 632. In some embodiments, the power consumed via the outlets 630 may be measured and used to estimate the amount of heat flow to the space 600 associated with the space 600.

As shown in FIG. 6, people 634 (and/or other animals) can occupy the space 600 and provide heat to the space 600 (i.e., body heat generated by biological processes). The space 600 is also shown to include an occupancy sensor 636 configured to determine whether one or more people 634 are present in the space 600, count the number of people 634 in the space 600, and/or count the number of people 634 that pass through a door 637 that allows entry to the space 600. A carbon dioxide ($CO_2$) sensor 635 is included in the space 600 and is configured to measure the $CO_2$ level (concentration, etc.) in the space 600. Because $CO_2$ is exhaled by people 634 in the space 600, the level of $CO_2$ in the space 600 may be indicative of the number of people 634 in the space 600 and the activity level of the people 634 in the space 600. In other embodiments, a security camera is included in the space 600 and configured to collect images and/or video of the space 600 that can be automatically processed to count a number of people in the space 600.

FIG. 6 also shows various other sensors associated with the space 600. For example, a humidity sensor 638 is positioned in the space 600 and is configured to measure the humidity in the space 600. As another example, a pressure sensor 640 is positioned in the space 600 and configured to measure an air pressure in the space 600. A door open/close sensor 639 is configured to collect data regarding whether the door 637 is open or closed. In some embodiments, the door open/close sensor 639 determines a duration of a time period for which the door is open or closed. In some embodiments, the door open/close sensor 639 is associated with an access system configured to determine an identity of a person opening or closing the door 637.

As shown in FIG. 6, a setpoint adjustment interface 642 is positioned in the space 600. The setpoint adjustment interface 642 is configured to provide an interface that a user can interact with to adjust a setpoint for the space 600, for example a temperature setpoint for the space 600. Accordingly, the setpoint adjustment interface 642 can receive user input indicative of a user-desired temperature for the space 600. In some embodiments, the setpoint adjustment interface 642 also provides heat to the space 600 due to electrical resistance in electronic circuits of the setpoint adjustment interface 642.

As illustrated in FIG. 6, the space 600 is served by HVAC equipment 644. The HVAC equipment 644 is configured to provide a heat flow to the space 600. That is, in various scenarios, the HVAC equipment 644 is configured to provide heating and/or cooling to the space 600. As described in detail below, the HVAC equipment 644 is controllable using a combination of feedforward and feedback control to provide heating and/or cooling to the space 600 to maintain the space 600 at or near a temperature setpoint for the space 600 based on quantified values of the various heat flows into the space 600 described above. In various embodiments, different types of HVAC equipment 644 are included, for example a variable air volume unit or an indoor unit of a variable refrigerant flow system. The HVAC equipment 644 may be included in a HVAC system 100 shown as shown in FIG. 1.

Figure 7:
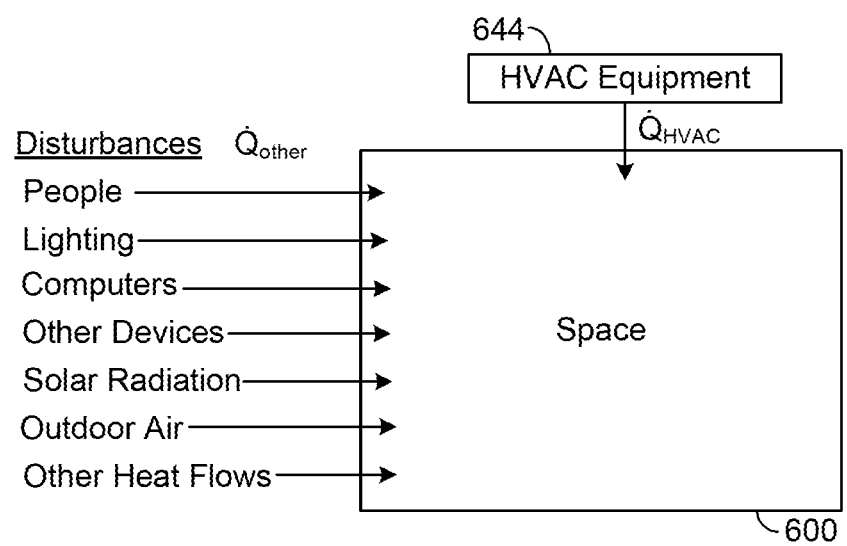
FIG. 7 is a schematic diagram of heat flows at the space of FIG. 6, according to an exemplary embodiment.

Referring now to FIG. 7, a block diagram illustrating heat flows at the space 600 is shown, according to an exemplary embodiment. The various heat flows described above are shown under the heading "disturbances," a term used herein to refer to the various heat flows to the space 600 other than from the HVAC equipment 644. That is, as illustrated in FIG. 7, people, lighting, computers, other electronic devices, solar radiation, outdoor air, and other heat flows (e.g., from neighboring spaces, from animals in the space) provide heat to the space, the total of which is denoted as $\dot{Q}_{other}$. It should be understood that, depending on the relative values of the various heat flows, the net value of $\dot{Q}_{other}$ there at any given point in time can be positive (indicating heating of the space 600 by the disturbances) or negative (indicating cooling of the space 600 by the disturbances).

As shown in FIG. 7, HVAC equipment 644 operates to provide heat $\dot{Q}_{HVAC}$ to the space 600. When HVAC equipment 644 is in a heating mode, $\dot{Q}_{HVAC}$ is greater than zero. when HVAC equipment 644 is in a cooling mode, $\dot{Q}_{HVAC}$ is less than zero.

In the example of FIG. 7, the two values $\hat{Q}_{HVAC}$ and $\dot{Q}_{other}$ characterize the total energy flow to the space 600, $\dot{Q}_{total} = \dot{Q}_{HVAC} + \dot{Q}_{other}$. The indoor air temperature within the space 600 changes based on the value of $\dot{Q}_{total}$. When $\dot{Q}_{total} > 0$, the temperature in the space 600 increases. When $\dot{Q}_{total} < 0$, the temperature in the space 600 decreases. When $\dot{Q}_{total} = 0$, the temperature in the space 600 stays approximately constant. Accordingly, if the HVAC equipment 644 is controlled to provide $\dot{Q}_{HVAC} = -\dot{Q}_{other}$, the space 600 is maintained approximately at an established temperature, for example a setpoint temperature selected by a user via setpoint adjustment interface 642. However, $\dot{Q}_{other}$ cannot be measured directly. Accordingly, as described in detail below, the systems and methods described herein apply a combination of feedforward control based on estimations of disturbance heat flows and feedback control to control $\dot{Q}_{HVAC}$ to manage the total heat flow for the space 600.

Figure 8:
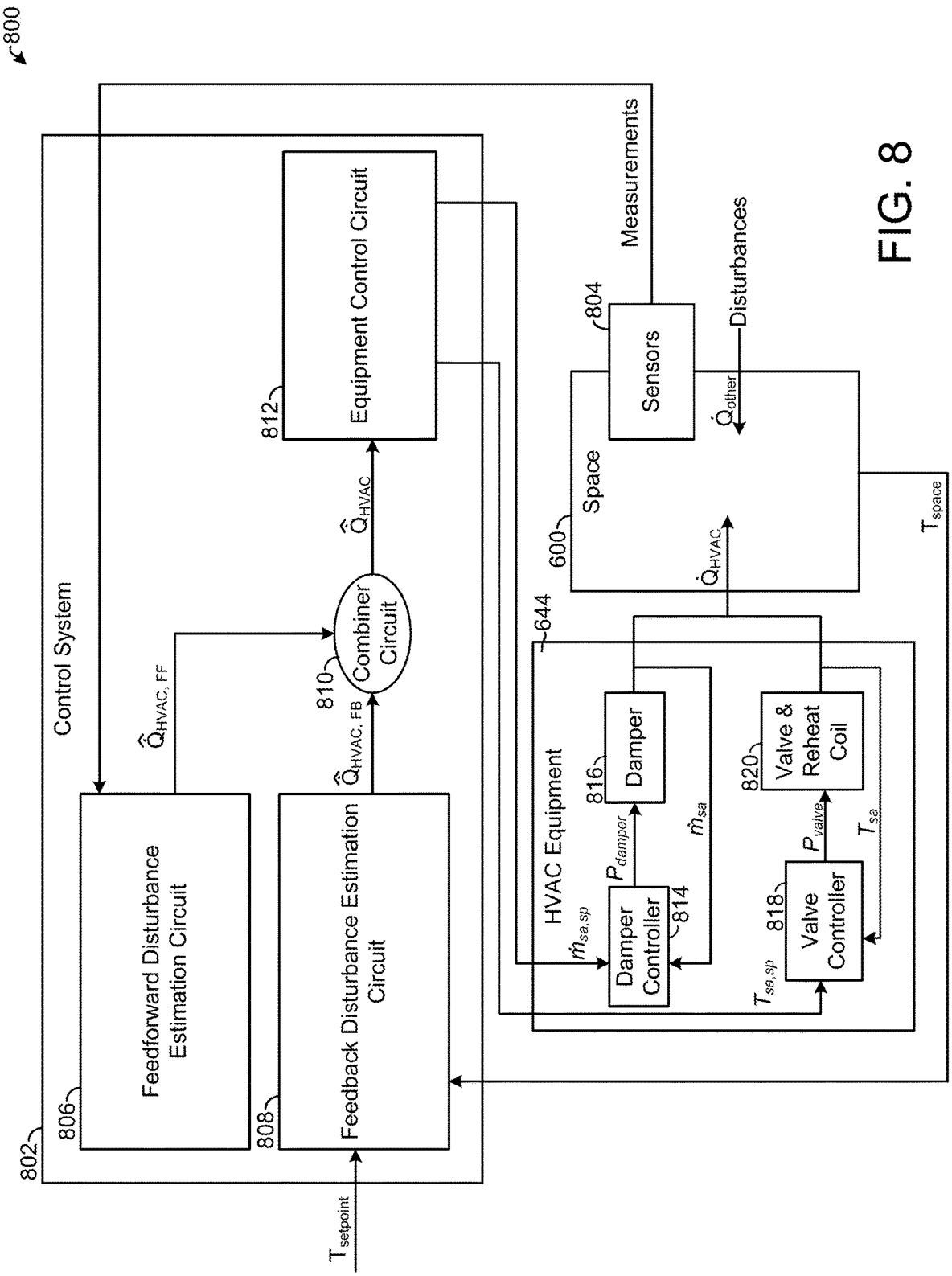
FIG. 8 is a block diagram of a system for controlling the total energy flow at the space of FIG. 6, according to an exemplary embodiment.

Referring now to FIG. 8, a block diagram of a system 800 is shown, according to an exemplary embodiment. The system 800 includes a control system 802 communicably coupled to sensors 804 and HVAC equipment 644. In various embodiments, the system 800 may be included with a BMS, for example BMS 400 of FIG. 4 or BMS 500 of FIG. 5. The HVAC equipment 644 is configured to provide $\dot{Q}_{HVAC}$ to the space 600. In the example shown in FIG. 8 and described below, the HVAC equipment 644 is a variable air volume box. In other embodiments, other types of HVAC equipment 644 are included.

The sensors 804 are configured to obtain measurements of parameters relating to the space 600 and provide the measurements (i.e., data collected by the sensors 804) to the control system 802. The sensors 804 can include the temperature sensors 604, 606, 612, exterior light sensor 620, $CO_2$ sensor 635, occupancy sensor 636, humidity sensor 638, pressure sensor 640, and/or various other sensors included with the space 600. For example, the sensors 804 may also include power meter(s) configured to measure electrical consumption at the space 600 (e.g., via outlet 630). As another example, the sensors 804 may include one or more data sources configured to obtain activity metrics for the computers 624, 626 (e.g., number of computers present in the space 600, number of computers connected to a network, CPU utilization of each computer, etc.), for the projector 627, for the telephone 628, for the lighting 622, and/or for other various devices located in the space 600. Other sensors 804 can be included in various embodiments, including security cameras, access control devices, fire detection devices, etc. The sensors 804 may be communicable with the control system via a building automation network, for example using a BACnet/MSTP or Modbus protocol, or a IT network, for example using an IP protocol, or some combination thereof.

The control system 802 is shown to include a feedforward disturbance estimation circuit 806, a feedback disturbance estimation circuit 808, a combiner circuit 810, and an equipment control circuit 812. The feedforward disturbance estimation circuit 806 is configured to receive measurements from the sensors 804 and generate an estimated disturbance heat flow $\hat{Q}_{other}$ based on the measurements. The feedforward disturbance estimation circuit 806 is also configured to generate a feedforward heat flow contribution $\hat{Q}_{HVAC,FF}$ based on the estimated disturbance heat flow $\hat{Q}_{other}$ and provide the feedforward heat flow contribution $\hat{Q}_{HVAC,FF}$ to the combiner circuit 810. The feedforward disturbance estimation circuit 806 is shown in detail in FIG. 9 and described in further detail with reference thereto.

The feedback disturbance estimation circuit 808 is configured to receive indoor air temperature measurements $T_{space}$ of the space 600 (e.g., from temperature sensor 606) and the setpoint temperature $T_{setpoint}$ for the space 600 and apply a feedback control approach to generate a feedback heat flow contribution $\hat{Q}_{HVAC,FB}$ that attempts to drive the measured temperature $T_{space}$ towards the setpoint $T_{setpoint}$. For example, the feedback disturbance estimation circuit 808 may apply a proportional-integral control approach, a proportional-integral-derivative control approach, etc. to generate the feedback heat flow contribution $\hat{Q}_{HVAC,FB}$. Because the feedback heat flow contribution $\hat{Q}_{HVAC,FB}$ quantifies an amount of heat to be generated by the HVAC equipment 644 to counteract effects of the disturbance heat flows on the temperature in the space 600 to maintain $T_{space}$ at the setpoint $T_{setpoint}$, the feedback heat flow contribution $\hat{Q}_{HVAC,FB}$ corresponds to an estimated disturbance heat flow $\hat{Q}_{other}$. Accordingly, by generating the feedback heat flow contribution $\hat{Q}_{HVAC,FB}$, the feedback disturbance estimation circuit 808 estimates the disturbance heat flow $\hat{Q}_{other}$.

The combiner circuit 810 is configured to receive the feedforward heat flow contribution $\hat{Q}_{HVAC,FF}$ and the feedback heat flow contribution $\hat{Q}_{HVAC,FB}$ and generate a combined control signal $\hat{Q}_{HVAC}$. In some embodiments, the combiner circuit 810 is configured to calculate the combined control signal $\hat{Q}_{HVAC}$ as an average or weighted average of the feedforward heat flow contribution $\hat{Q}_{HVAC,FF}$ and the feedback heat flow contribution $\hat{Q}_{HVAC,FB}$. Various methods of calculating the combined control signal $\hat{Q}_{HVAC}$ based on the feedforward heat flow contribution $\hat{Q}_{HVAC,FF}$ and the feedback heat flow contribution $\hat{Q}_{HVAC,FB}$ are contemplated by the present disclosure.

The equipment control circuit 812 is configured to receive the combined control signal $\hat{Q}_{HVAC}$, which characterizes an amount of heat to be provide to the space 600 by the HVAC equipment 644, and determine equipment setpoints for the HVAC equipment 644 to achieve the amount of heat specified by the combined control signal $\hat{Q}_{HVAC}$. In the example shown, the HVAC equipment 644 includes a VAV box. The VAV box is controllable to provide a rate of supply air $\dot{m}_{sa}$ (i.e., air flow with units of mass/time) at a supply air temperature $T_{sa}$. The equipment controller is configured to receive the combined control signal $\hat{Q}_{HVAC}$ and determine a flow rate setpoint $\dot{m}_{sa,sp}$ and a supply air temperature setpoint $T_{sa,sp}$ at which the VAV box supplies the heat flow $\hat{Q}_{HVAC}$ as requested by the combined control signal generated by the combiner circuit 810. For example, in some embodiments the equipment control circuit 812 calculates the values of $\dot{m}_{sa,sp}$ and $T_{sa,sp}$ using the equations $$\dot{m}_{sa,sp} = \frac{\hat{Q}_{HVAC}}{c_p * (T_{sa} - T_{setpoint})} \text{ and/or}$$

$$T_{sa,sp} = \frac{\hat{Q}_{HVAC}}{\dot{m}_{sa} * c_p} + T_{space},$$

where $c_p$ is the specific heat capacity of the air in the space 600. The equipment control circuit 812 provides the equipment setpoints (i.e., $\dot{m}_{sa,sp}$ and $T_{sa,sp}$) to the HVAC equipment 644.

The HVAC equipment 644 receives the equipment setpoints and operates to provide supply air to the space 600 in accordance with the equipment setpoints. In the example shown, the HVAC equipment 644 includes a damper controller 814 configured to control a damper position $P_{damper}$ for a damper 816 to control an actual air flow rate $\dot{m}_{sa}$ towards the setpoint $\dot{m}_{sa,sp}$. The damper controller receives measurements of the flow rate $\dot{m}_{sa}$ and $\dot{m}_{sa,sp}$ and uses feedback control to select the damper position $P_{damper}$. The damper 816 allows a variable rate of airflow into the space 600 based on the position of the damper 816.

The HVAC equipment 644 is also shown to include a valve controller 818 configured to control a valve position $P_{valve}$ for a valve and reheat coil 820. The valve position affects the amount of heat transfer that occurs between the reheat coil 820 and the supply air as the supply air is forced through the HVAC equipment 644. The position of the valve 820 can therefore be controlled to manage the supply air temperature $T_{sa}$. The valve controller 818 receives $\hat{Q}_{HVAC}$ measurements of the supply air temperature $T_{sa}$ and the supply air temperature setpoint $T_{sa,sp}$ and uses feedback control to select the valve position $P_{valve}$ to drive $T_{sa}$ toward $T_{sa,sp}$.

The HVAC equipment 644 is thereby controlled to provide HVAC heat flow $\dot{Q}_{HVAC}$ to the space 600. When the HVAC equipment 644 is well-controlled (e.g., when $\dot{m}_{sa} = \dot{m}_{sa,sp}$ and $T_{sa} = T_{sa,sp}$), $\dot{Q}_{HVAC}$ is approximately equal to the combined control signal $\hat{Q}_{HVAC}$. Because the combined control signal $\hat{Q}_{HVAC}$ can represent the negative of an estimated disturbance heat flow $\hat{Q}_{other}$, the HVAC equipment 644 can thereby provide an amount of heat $\dot{Q}_{HVAC}$ that is approximately equal in magnitude to the actual disturbance heat flow $\dot{Q}_{other}$. The system 800 is thereby configured to maintain the temperature of the space 600 at or near a setpoint temperature by providing an HVAC heat flow $\dot{Q}_{HVAC}$ that is approximately equal in magnitude to the disturbance heat flow $\dot{Q}_{other}$.

Figure 9:
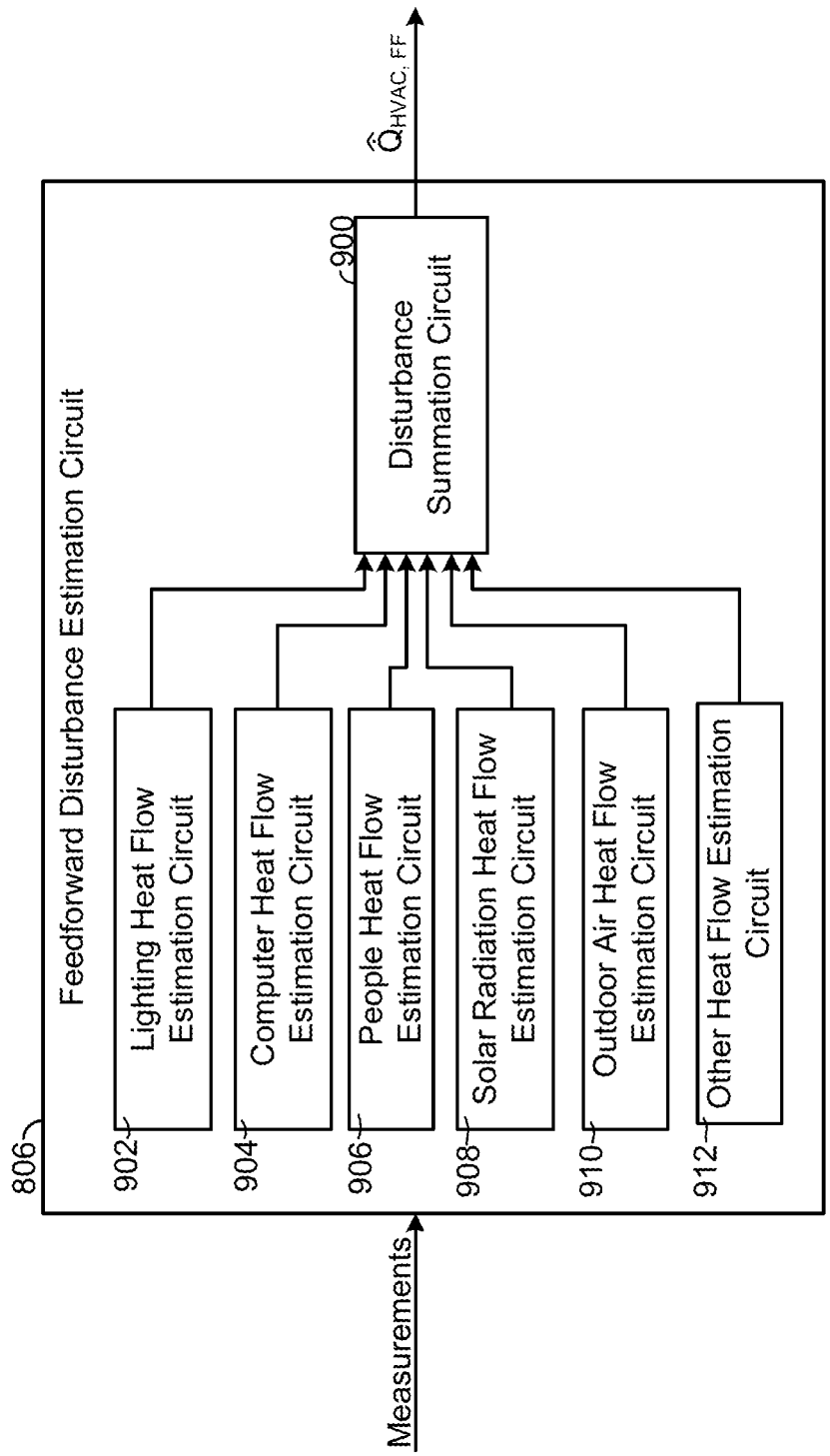
FIG. 9 is a detailed block diagram of a feedforward disturbance estimation circuit of the system of FIG. 8, according to an exemplary embodiment.

Referring now to FIG. 9, a detailed view of the feedforward disturbance estimation circuit 806 is shown, according to an exemplary embodiment. As illustrated in FIG. 9, the feedforward disturbance estimation circuit 806 receives measurements (e.g., from sensors 804) and generates a feedforward heat flow contribution $\hat{Q}_{HVAC,FF}$. The feedforward disturbance estimation circuit 806 is shown to include a disturbance summation circuit 900 that determines and outputs the feedforward heat flow contribution $\hat{Q}_{HVAC,FF}$ based on heat flow estimations from multiple heat flow estimation circuits of the feedforward disturbance estimation circuit 806. In the example shown, the feedforward disturbance estimation circuit 806 includes a lighting heat flow estimation circuit 902, a computer heat flow estimation circuit 904, a people heat flow estimation circuit 906, a solar radiation heat flow estimation circuit 908, an outdoor air heat flow estimation circuit 910, and an other heat flow estimation circuit 912.

Each of the various heat flow estimation circuit 902-914 is configured to generate an estimation of a corresponding disturbance heat flow. Accordingly, the heat flow estimation circuits included in a particular implementation can vary to account for the particular disturbance heat flows relevant for space served by the particular implementation. Additionally, while the various heat estimation circuits 902-912 are separate circuits included within the feedforward disturbance estimation circuit 806 in the embodiment of FIG. 9, it should be understood that the functions attributed thereto herein may be implemented in a variety of architectures.

The lighting heat flow estimation circuit 902 is configured to estimate a heat flow into the space 600 created by the lighting 622 in the space 600, for example incandescent light bulbs, florescent tubes, light emitting diodes, etc. positioned in the space 600. In some embodiments, the lighting heat flow estimation circuit 902 receives lighting data ('measurements' within the meaning of the present application) relating to whether the lighting 622 (or portions thereof) is on, off, or set to a particular illumination level at each time step. In some embodiments, the lighting data is received from IP-enabled lighting devices and/or IP-enabled light switches/controllers. In some embodiments, the lighting data is received from a sensor 804 that measures the brightness of the space 600. In some embodiments, the lighting heat flow estimation circuit 902 also stores a look-up table of predetermined heat outputs of the lighting 622. In such embodiments, the lighting heat flow estimation circuit 902 associates the lighting data (e.g., indicating that all lighting 622 is turned on for the space 600) with an entry in the look-up table that indicates that the lighting 622 outputs a predetermined value of energy per unit time for each possible state of the lighting 622 (e.g., 2 BTU when all lighting 622 is turned on). The lighting heat flow estimation circuit 902 can then estimate the disturbance heat flow to be approximately equal to the predetermined value of energy per unit time output by the lighting 622 when the lighting 622 is in the state indicated by the lighting data/measurements. The lighting heat flow estimation circuit 902 provides the estimate of the lighting heat flow to the disturbance summation circuit 900.

The computer heat flow estimation circuit 904 is configured to estimate a heat flow into the space 600 created by computers 624, 626 in the space. In some embodiments, the computer heat flow estimation circuit 904 receives data (measurements) indicative of the number of computers present in the space 600. For example, a WiFi router that provides a WiFi network in the space 600 may be configured to determine a number of computers connected to the WiFi network in the space 600 and provide the number to the computer heat flow estimation circuit 904. As another example, the computers 624, 626 may be configured to self-measure the CPU utilization or other activity metric of the computers 624, 626 and provide such measurements to the computer heat flow estimation circuit 904. The computer heat flow estimation circuit 904 is configured to receive information about the number of computers in the space 600, the utilization of the computers, etc. and generate an estimation of the corresponding heat generation.

In some embodiments, the computer heat flow estimation circuit 904 stores an average heat generation value that characterizes the average amount of heat generated by a computer 624, 626. The computer heat flow estimation circuit 904 can multiple this average value by the number of computers in the space 600 (based on received data/measurements) to obtain an estimation of the heat generated by the computers 624, 626. In some embodiments, computer heat flow estimation circuit 904 applies a scaling factor or other algorithm that translated CPU utilization or other computer activity data into a corresponding heat estimation. The computer heat flow estimation circuit 904 provides an estimation of the heat generated by the computers 624, 626 to the disturbance summation circuit 900.

The people heat flow estimation circuit 906 is configured to estimate the heat flow provided by people in the space 600 and provide the estimation to the disturbance summation circuit 900.

In some embodiments, the people heat flow estimation circuit 906 receives measurements from the occupancy counter 636 that indicate the number of people in the space 600. In such embodiments, the people heat flow estimation circuit 906 may estimate the heat generated by the people as a multiple of the number of people in the space (as measured by the occupancy counter 636) and a predetermined per-person heat value.

In some embodiments, the people heat flow estimation circuit 906 is configure to use measurements from the $CO_2$ sensor 635 to improve the determination of the number of the people in the space 600. In some embodiments, the amount of $CO_2$ exhaled by people in the space 600 is indicative of an activity level of people in the space and therefore correlate with the heat generated by the people in the space 600. For example, if people in the space 600 are exercising, the people will output more $CO_2$ and heat than if the people are sitting still. Accordingly, in some embodiments, the people heat flow estimation circuit 906 is configured to analyze measurements from the $CO_2$ sensor 635 (e.g., in combination with the occupancy sensor 636) to estimate the heat generated by the people in the space 600.

In various other embodiments, the people heat flow estimation circuit 906 is configured to augment, improve, verify, etc. estimations of the number of people in the space 600 and/or the heat generated by the people in the space 600 using various other sensors and data streams. For example, in some embodiments, the number of people in the space 600 can be estimated based on a number of smartphones connected to a WiFi router in the space 600 as measured by the WiFi router, based on an assumption that approximately everyone in the space 600 is carrying a smartphone connected to the WiFi network. As another example, data relating to the number of people who pass through the door 637 to the space 600 (e.g., from the door open/close sensor 639 or a security/access system) can be used to augment, improve, verify, etc. estimations of the number of people in the space 600. The people heat flow estimation circuit 906 can be configured to use any variety of such data sources in various embodiments.

The solar radiation heat flow estimation circuit 908 is configured to estimate an amount of heat provide to the space 600 by solar radiation 616 incident on the space 600. In some embodiments, the solar radiation heat flow estimation circuit 908 receives measurements of the external light received at the space 600 from the external light sensor 620. In some embodiments, the solar radiation heat flow estimation circuit 908 is communicable with a weather service (e.g., a web-based source of weather data accessible via the Internet) that provides information relating to the occlusion and/or position of the sun at a given time (e.g., indicating that a particular type of cloud is present, indicating a time of sunrise or sunset, etc.). In some embodiments, the solar radiation heat flow estimation circuit 908 receives position information from the window shade 618 indicating whether the window shade 618 is deployed to block solar radiation from entering the space 600 via windows 614.

Based on such data (or a combination thereof), the solar radiation heat flow estimation circuit 908 uses such measurements to estimate the amount of heat provided by the solar radiation 616 (e.g., light entering the space 600 via the windows 614 and/or providing energy to exterior wall 608). In some embodiments, the solar radiation heat flow estimation circuit 908 also uses other static parameters of the space, for example a surface area of the space (e.g., of exterior wall 608) on which solar radiation 616 may fall, a geographical orientation of the exterior wall 608 (i.e., north-facing, south-facing, east-facing, etc.), latitude of the space 600 on Earth, etc. In some embodiments, the date or season (i.e., the time of year) is used by the solar radiation heat flow estimation circuit 908 in estimating the heat flow for the space attributed to solar radiation 616. The solar radiation heat flow estimation circuit 908 provides the estimation to the disturbance summation circuit 900.

The outdoor air heat flow estimation circuit 910 is configured to estimate the heat transfer from the outdoor air 610 to the space 600 via the exterior wall 608 and/or the windows 614. In some embodiments, the outdoor air heat flow estimation circuit 910 receives measurements of the outdoor air temperature from the outdoor air temperature sensor 612. In some embodiments, the outdoor air heat flow estimation circuit 910 is communicable with a weather service (e.g., a web-based source of weather data accessible via the Internet) that provides information relating to properties of the outdoor air (temperature, humidity, wind speed, etc.) that can affect heat transfer. In some embodiments, the outdoor air heat flow estimation circuit 910 also receives measurements relating to the indoor air, for example indoor air temperature measured by the temperature sensor 606 and indoor air humidity measured by the humidity sensor 638. In some embodiments, the outdoor air heat flow estimation circuit 910 receives a measurement of the indoor air pressure 640 and can compare the indoor air pressure 640 to the outdoor air pressure (e.g., from a weather service, from an outdoor pressure sensor) to improve approximation of heat transfer. Such measurements can be used by the outdoor air heat flow estimation circuit 910 to estimate the heat transfer from the outdoor air 610 to the space 600.

In some embodiments, the outdoor air heat flow estimation circuit 910 stores pre-determined metrics relating to the thermal insulation or conductivity of the exterior wall 608. For example, based on the surface area, thickness, materials, etc. of the exterior wall 608, a function may be pre-constructed that maps a difference between outdoor air temperature and indoor air temperature to a rate of heat transfer through the wall 608. In some embodiments, humidity and/or wind speed are included as variables in such a function. In such an example, the outdoor air heat flow estimation circuit 910 is configured to use the measurements as inputs to the function to calculate an estimated heat transfer from the outdoor air 610 to the space 600.

The other heat flow estimation circuit 912 is configured to estimate other miscellaneous heat flows at the space 600 (i.e., heat flows not assessed by heat flow estimation circuits 902-910). In some embodiments, the other heat flow estimation circuit 912 quantifies heat flows from miscellaneous devices in the space 600, for example projector 627, telephone 628, and setpoint adjustment interface 642. In some embodiments, the other heat flow estimation circuit 912 quantifies heat flows from neighboring spaces 602 to the space 600 via interior walls 603 (e.g., based on measurements from temperature sensors 604 in the neighboring spaces 602). In some cases, measurements from the pressure sensor 640 and pressure sensors located in neighboring spaces can be used to facilitate estimation of air flow between neighboring spaces, through door 639, etc.

In some cases, the other heat flow estimation circuit 912 may provide an estimate of a static miscellaneous heat flow that quantifies disturbances that provide approximately constant heat transfer. For example, the telephone 628, the setpoint adjustment interface 642, various sensors 804, etc. may operate constantly and generate an approximately constant amount of heat from electrical resistance therein.

It should be understood that in other embodiments, various heat flow estimations may be executed by the heat flow estimation circuits 902-912 based on measurements from sensors 804, other external data sources (e.g., web-based weather services, room scheduling system, other specialty systems), and pre-stored/pre-determined data (e.g., physical parameters of the space, average heat outputs of various devices or organisms, etc.). In preferred embodiments, the heat flow estimation circuits 902-912 generate estimations of all non-negligible disturbance heat flows at the space 600, i.e., all non-negligible positive or negative transfers of heat flow into the indoor air in the space 600.

The disturbance summation circuit 900 receives the various estimated heat flows from the heat flow estimation circuits 902-912 and adds them together to calculate a total estimated disturbance heat flow $\hat{Q}_{other}$. If the space 600 is already at or near a setpoint temperature of the space, the disturbance summation circuit 900 then generates a feedforward heat flow contribution having a value $\hat{Q}_{HVAC,FF}$ equal to $-\hat{Q}_{other}$. That is, in the embodiment shown, the disturbance summation circuit 900 generates a feedforward heat flow contribution intended to control the HVAC equipment 644 to counteract the effects of the various disturbance heat flows on the temperature in the space 600 to maintain the space 600 at an established setpoint temperature. In some embodiments, if the temperature at the space 600 has deviated from the setpoint temperature, the disturbance summation circuit 900 can define value $\hat{Q}_{HVAC,FF}$ equal to $-\hat{Q}_{other}$ plus or minus a factor configured to cause $-\hat{Q}_{HVAC,FF}$ to deviate from $-\hat{Q}_{other}$ other in order to control the HVAC equipment 644 to drive the temperature at the space 600 toward the temperature setpoint.

As described above with reference to FIG. 8, the feedforward disturbance estimation circuit 806 provides the feedforward heat flow contribution $\hat{Q}_{HVAC,FF}$ to the combiner circuit 810, which generates a combined control signal based on the feedforward heat flow contribution $\hat{Q}_{HVAC,FF}$ and the feedback heat flow contribution $\hat{Q}_{HVAC,FB}$ and provides the combined control signal to the equipment control circuit 812. The HVAC equipment 644 is thereby controlled based on the feedforward heat flow contribution $\hat{Q}_{HVAC,FF}$ (i.e., based on the various heat flow estimations obtained by the heat flow estimation circuits 902-912).

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

As used herein, the term "circuit" may include hardware structured to execute the functions described herein. A "controller" may include one or more circuits. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for controlling temperature of a building space, the system comprising:
   HVAC equipment configured to serve the building space;
   a plurality of sensors configured to measure a plurality of parameters relating to the building space;
   a control system configured to:
      receive data from the plurality of sensors;
      generate a plurality of disturbance energy transfer estimates for the building space based on the data from the plurality of sensors;
      determine a feedforward energy transfer contribution based on the disturbance energy transfer estimates;
      determine a feedback energy transfer contribution based on a measured temperature of the building space and a temperature setpoint for the building space;
      combine the feedforward energy transfer contribution and the feedback energy transfer contribution to determine a target energy transfer to be provided to the building space by the HVAC equipment; and
      control the HVAC equipment to provide the target energy transfer.

2. The system of claim 1, wherein the feedforward energy transfer contribution is calculated as approximately an opposite of a total disturbance energy transfer estimate, the total disturbance energy transfer estimate defined as a sum of the plurality of disturbance energy transfer estimates.

3. The system of claim 1, wherein the plurality of disturbance energy transfer estimates comprise a people energy transfer estimate that quantifies an energy transfer from one or more people in the building space to indoor air of the building space.

4. The system of claim 3, wherein the plurality of sensors comprise an occupancy sensor configured to obtain a measurement of a number of people located in the building space; and
   wherein the control system is configured to generate the people energy transfer estimate based on the measurement from the occupancy sensor and a predetermined per-person heat flow.

5. The system of claim 3, wherein:
   the plurality of sensors comprise:
      an occupancy sensor configured to obtain a measurement of a number of people located in the building space;
      a carbon dioxide sensor configured to obtain a measurement of a carbon dioxide concentration in the building space; and
   the control system is configured to generate the people energy transfer estimate based on the measurement of the number of people located in the building space and the measurement of the carbon dioxide concentration in the building space.

6. The system of claim 1, wherein the plurality of disturbance energy transfer estimates comprise a computer energy transfer estimation that quantifies an energy transfer from one or more computers in the building space to indoor air of the building space.

7. The system of claim 6, wherein the plurality of sensors comprise a network router configured to provide a wireless network for the building space and obtain data indicating a number of computers connected to the wireless network for the building space; and
   wherein the control system is configured to generate the computer energy transfer estimation based on the number of computers connected to the wireless network for the building space.

8. The system of claim 1, wherein a plurality of disturbance heat flow estimates comprise a solar radiation energy transfer estimation that quantifies a rate of heat transfer to the building space caused by solar radiation; and
   wherein the control system is configured to generate the solar radiation energy transfer estimation based on at least one of brightness measurements from an exterior light sensor of the plurality of sensors, position information for an automated window shade, or weather data.

9. The system of claim 1, wherein the plurality of disturbance energy transfer estimates comprise at least one of a lighting energy transfer estimate, a projector energy transfer estimate, an electrical load energy transfer estimate, or a telephone energy transfer estimate.

10. A method for controlling temperature of a building space, the method comprising:
    obtaining measurements of various parameters relating to the building space;
    generating a plurality of disturbance energy transfer estimates for the building space based on the measurements;
    determining a feedforward energy transfer contribution based on the plurality of disturbance energy transfer estimates;
    determining a feedback energy transfer contribution based on a measured indoor air temperature of the building space and a temperature setpoint for the building space;
    combining the feedforward energy transfer contribution and the feedback energy transfer contribution to determine a target energy transfer to be provided to the building space by HVAC equipment; and
    controlling the HVAC equipment to provide the target energy transfer to the building space.

11. The method of claim 10, wherein determining a feedforward energy transfer contribution based on the plurality of disturbance energy transfer estimates comprises:
    calculating a total disturbance energy transfer estimate as a sum of the plurality of disturbance energy transfer estimates; and
    defining the feedforward energy transfer contribution as approximately an opposite of the total disturbance energy transfer flow estimate.

12. The method of claim 10, wherein generating a plurality of disturbance energy transfer estimates for the building space based on the measurements comprises generating a people heat flow estimate that quantifies a energy transfer from one or more people in the building space to indoor air of the building space.

13. The method of claim 12, wherein obtaining measurements of various parameters relating to the building space comprises measuring, by an occupancy sensor, a number of people located in the building space; and wherein generating the people energy transfer estimate comprises calculating the people energy transfer estimate based on the number of people located in the building space and a predetermined per-person energy transfer.

14. The method of claim 12, wherein obtaining measurements of various parameters relating to the building space comprises measuring, by an occupancy sensor, a number of people located in the building space and measuring, by a carbon dioxide sensor, a carbon dioxide concentration in the building space; and wherein generating the people energy transfer estimate comprises calculating the people energy transfer estimate based on the number of people located in the building space and the carbon dioxide concentration in the building space.

15. The method of claim 10, wherein generating the plurality of disturbance energy transfer estimates for the building space based on the measurements comprises generating a computer energy transfer estimation that quantifies a rate of heat transfer from one or more computers in the building space to indoor air of the building space.

16. The method of claim 15, wherein obtaining measurements of various parameters relating to the building space comprises obtaining an indication of a number of computers that are connected to a network for the building space; and wherein generating the computer energy transfer estimation comprises calculating the computer energy transfer estimation based on the indication of the number of computers that are connected to the network for the building space.

17. The method of claim 10, wherein obtaining measurements of various parameters relating to the building space comprises at least one of obtaining brightness measurements from an exterior light sensor, obtaining position information for a window shade at the building space, or obtaining weather data from a weather service; and wherein generating the plurality of disturbance energy transfer estimates for the building space comprises generating a solar radiation heat flow estimation that quantifies a rate of heat transfer to the building space caused by solar radiation based on at least one of the brightness measurements, the position information for the window shade, or the weather data.

18. The method of claim 10, wherein generating the plurality of disturbance energy transfer estimates for the building space comprises generating at least one of a lighting energy transfer estimate, a projector energy transfer estimate, an electrical load energy transfer estimate, or a telephone energy transfer estimate.

19. One or more non-transitory computer-readable media containing program instructions that, when executed by one or more processors, cause the one or more processors to perform operations comprising:

obtaining measurements of various parameters relating to a building space;

generating a plurality of disturbance energy transfer estimates for the building space based on the measurements;

determining a feedforward energy transfer contribution based on the plurality of disturbance energy transfer estimates, the feedforward energy transfer contribution specifying a target energy transfer to be provided to the building space by HVAC equipment, the target energy transfer approximately equal to an opposite of a sum of a plurality of disturbance heat flow estimates; and controlling the HVAC equipment to provide the target energy transfer to the building space.

20. The one or more non-transitory computer-readable media of claim 19, wherein controlling the HVAC equipment to provide the target energy transfer to the building space causes an indoor air temperature of the building space to be maintained at an approximately constant value.

21. The method of claim 10, wherein combining the feedforward energy transfer contribution and the feedback energy transfer contribution to determine a target energy transfer comprises calculating an average of the feedforward energy transfer contribution and the feedback energy transfer contribution.

22. The system of claim 1, wherein the HVAC equipment comprises a variable air volume (VAV) box and the control system is configured to provide the target energy transfer by:

determining a supply air temperature setpoint and an air flow rate setpoint based on the target energy transfer; and controlling the VAV box to achieve the supply air temperature setpoint and the air flow rate setpoint.

\* \* \* \* \*